United States Patent

Guretzky

[11] 4,320,293
[45] Mar. 16, 1982

[54] ANGLE-POSITION TRANSDUCER

[76] Inventor: Harold Guretzky, 56-05 Clearview Exp., Bayside, N.Y. 11364

[21] Appl. No.: 180,335

[22] Filed: Aug. 22, 1980

Related U.S. Application Data

[63] Continuation of Ser. No. 934,680, Aug. 30, 1978, abandoned.

[51] Int. Cl.³ ............................................. G01D 5/34
[52] U.S. Cl. ........................... 250/231 SE; 250/211 K
[58] Field of Search ........ 250/211 K, 231 R, 231 SE, 250/237 G, 216; 340/347 P

[56] References Cited

U.S. PATENT DOCUMENTS

| | | | |
|---|---|---|---|
| 1,985,044 | 12/1934 | Lyle | 250/211 K |
| 2,796,598 | 6/1957 | Cartwright | 340/347 P |
| 2,879,405 | 3/1959 | Pankove | 250/211 K |
| 3,258,601 | 6/1966 | Suleski | 250/211 K |
| 3,649,840 | 3/1972 | Thorn et al. | 250/211 K |
| 4,103,155 | 7/1978 | Clark | 250/231 SE |
| 4,109,147 | 8/1978 | Heske | 250/231 R |

Primary Examiner—David C. Nelms
Attorney, Agent, or Firm—Howard Alan Taishoff

[57] ABSTRACT

An angle-position transducer using light-interrogation employs an optical track and a beam of light. The light beam is formed into a narrow line-pattern. The line-pattern is directed to impinge on the optical track as the optical track moves angularly relative to the line-pattern. The optical track and line-pattern interact in a way that alters the line-pattern unambiguously. A target detector intercepts the altered radiation and applies a proportional signal to electronic means for digital display.

15 Claims, 5 Drawing Figures

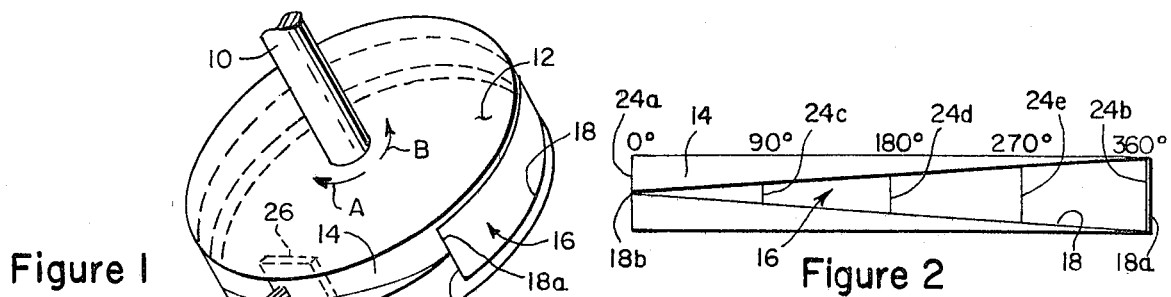
Figure 1
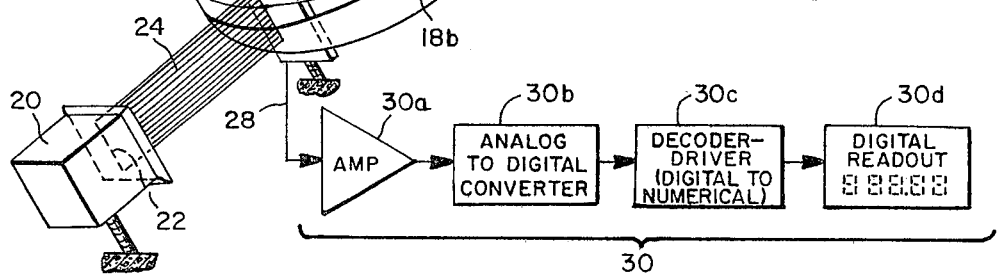
Figure 2
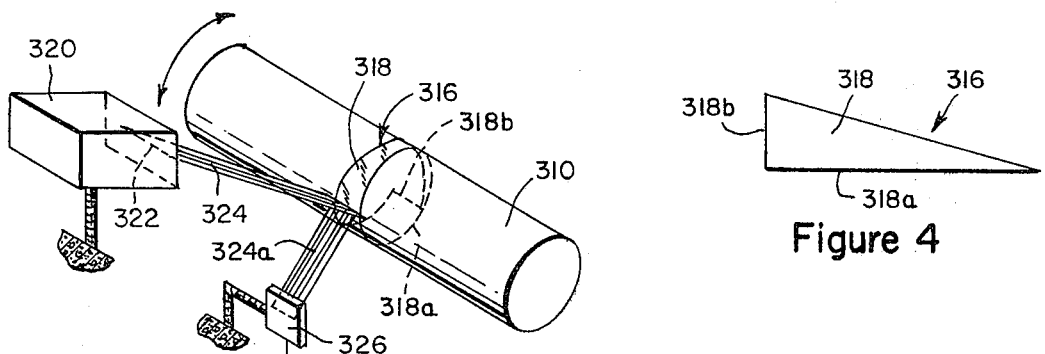
Figure 3
Figure 4
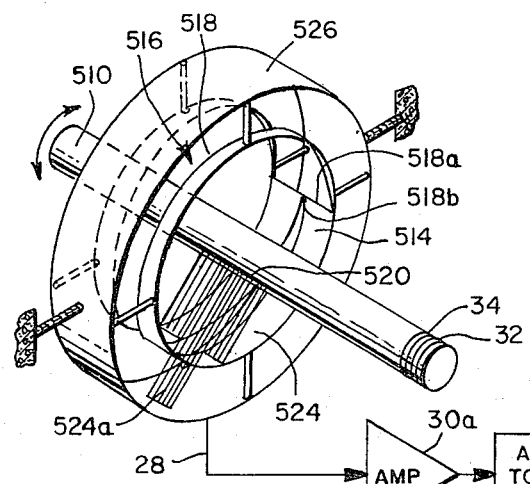
Figure 5

ANGLE-POSITION TRANSDUCER

This is a continuation of application Ser. No. 943,680 filed Aug. 30, 1978, now abandoned.

This invention relates to a position transducer and, more particularly, the present invention relates to apparatus for determining the relative angular displacement of a shaft or sphere.

In numerous applications it is necessary to determine the angular displacement of a shaft or sphere or some other rotating part. In delicate systems may perceptible physical interaction between the position-sensing device and shaft (or sphere) tends to degrade the accuracy of the overall system. In prior constructions there are numerous angle-position sensors or transducers that use light-interrogation when determining relative angular displacement. With light-interrogation there is no preceptible interaction between the measuring apparatus and system being measured.

However, prior devices that employ light-interrogation tend to be complicated and unduly massive, i.e., they add inertia to the system they are measuring. For example, there are several angle-position transducers that employ optical shaft encoding. Generally, these optical shaft encoders use at least one optically encoded disc that is attached to the shaft. Such optically encoded discs have some form of code track that, most often, employs sequential areas that are alternately transparent and opaque to the radiation used. But, encoded discs are expensive to manufacture and they are massive, relatively speaking. Even in these relatively simple systems that employ optically encoded shafts, the processing electronics is complicated owing to the fact that these optical encoders usually measure minute phase angles of light-radiation. Further, there are some position transducers that determine relative angular displacement by means of a form of intensity modulation of light. In these devices, an array of parallel vanes extend longitudinally of a shaft axis. As the shaft and hence vanes rotate relative to both a stationary light source and an optical sensor, they intensity modulate a light beam. While such systems are relatively simple, they appear ill-suited to application on a spherical member, and they, too, add unwanted inertial effects. And, it appears that in some prior devices the optics and electronics are such that the devices will not work, or might need recalibration if the shaft reverses direction.

The present invention overcomes several of the significant drawbacks of prior devices and provides an angle-position transducer of simplified construction but with precise or hyperfine resolution. In one embodiment, the present invention comprises an optical track in the form of a triangular aperture that is placed or formed on a shaft or sphere, the angular displacement of which is desired. The optical track extends around the circumferential periphery of the shaft. A stationary source of radiation, preferably laser light, has its output fixedly oriented and directed to impinge broadside on the optical track. The laser output is configured as a narrow line-pattern or line-beam. This line-beam illuminates a tightly defined line-pattern on the optical track as the shaft and the track revolve or stop in the sightline of the laser. A stationary target transducer or detector, appropriately aligned relative to the laser source, intercepts the radiation that traverses the triangular aperture. That portion of the triangular aperture that, at a given instant, is illuminated by the laser light, interacts with this light and alters the height or intensity of the line-pattern that is sent to the target transducer. Stated another way, the geometry of the optical track interacts with the fixed orientation of the line-pattern impinging thereon in a way that causes an unambiguous and, so to speak, modulated light signal to be sent to the target transducer. This "modulated" signal exhibits a one-to-one correspondence between the amount of light transmitted to the target transducer and the shaft position. The target transducer converts the "modulated" radiation to a proportional signal. By conventional techniques the analog output from the target transducer is converted to a digital signal. The digital signal is then readily decoded to a numerical display of relative angular displacement.

It is therefore an object of the present invention to provide an angle-position transducer of simplified construction yet providing a high degree of resolution.

It is a further object of the present invention to provide an angle-position transducer using light-interrogation wherein the transducer has an unambiguous output that has a one-to-one correspondence between light transmitted to a target detector and shaft position.

It is a still further object of the present invention to provide an angle-position transducer using light-interrogation which has a resultant signal output that varies linearly and uniquely with shaft position.

It is another object of the present invention to provide an angle-position transducer that causes negligible disturbance to the intertial balance of the system being measured, and which is readily adapted to a variety of such systems.

Other objects and features of the present invention will become apparent from the following detailed description considered in connection with the accompanying drawings. It is to be understood, however, that the drawings are designed for purposes of illustration only and not as a definition of the limits of the invention for which reference should be made to the appending claims.

In the drawings, wherein the same reference numeral denotes the same element throughout the several views:

FIG. 1 is a perspective view of one embodiment of the present invention shown attached to a shaft to indicate the angular displacement thereof;

FIG. 2 is a plan view of the optical track of FIG. 1 showing diagrammatically the respective modulated line-heights that are sent to the detector;

FIG. 3 is another embodiment of the present invention;

FIG. 4 is an enlarged view of the optical track employed in the embodiment of FIG. 3; and FIG. 5 is a further embodiment of the present invention.

More particularly now and referring to the drawings, FIG. 1 shows one embodiment of the present invention used to indicate angular displacement of a shaft 10. An enlarged cylindrical part or annular shell 12 concentrically is attached to shaft 10 for rotation therewith. Cylindrical part 12 is, in the embodiment shown, generally disc-like thereby defining a relatively narrow outer peripheral rim-band 14.

Disposed along the entire circumferential periphery of cylindrical band 14 is an optical track that is indicated generally by reference numeral 16. In the embodiment shown, and now reference is made to FIG. 2, optical track 16 is in the form of a triangular aperture 18 that is arranged along the perimetric circumference of band 14. More particularly, aperture 18 is in the form of an isosceles triangle having a base 18a and a vertex 18b. Base 18a is aligned parallel to the longitudinal axis of shaft 10. The height or altitude of triangular aperture 18 drawn from base 18a is equal to the circumference of band 14 thereby causing triangular aperture 18 to cover or subtend the last-mentioned circumference. With this construction, vertex 18b meets base 18a at a point thereby defining an abrupt discontinuity of cross-section seen clearly in FIG. 1.

A conventional and stationary source of radiation 20, preferably laser, is spaced from optical track 16. The output of laser 20 passes through a narrow slit or window 22. Slit 22 confines the emitted radiation into a tightly defined line-beam or line-pattern 24 having its broad width equal to at least the length of base 18a and parallel thereto. Line-beam 24 is directed towards band 14 and aperture 18 thus impinging broadside upon both. Because laser 20 is stationary, line-beam 24 is fixed in orientation relative to band 14 and thus remains parallel to base 18a as band 14 revolves. This maintained orientation line-beam 24 interacts with triangular aperture 18 in a way that will be described shortly. The intensity of line-beam 24 emanating from slit 22 must be held constant or precisely regulated. This might be done by regulation or the laser's voltage or current, or both.

A stationary target transducer or detector 26 is spaced inwardly of band 14 and aperture 18. This places transducer 26 inboard of cylindrical part 12. As seen in FIG. 1, target transducer or detector means 26 is aligned relative to line-pattern 24 so as to receive that portion of the line-pattern that passes through or is transmitted through triangular aperture 18 as this aperture revolves or stops in the sight-line of the laser. Transducer or detector means 26 is of conventional design and as such it can be one of several devices that convert one form of energy, in this case light, to a proportional or analog signal. Thus when light is used, target transducer 26 can be one of several conventional photoelectric or optoelectronic devices that is responsive to light. Suitable photoelectric devices include photovoltaic means, photoresistive means and phototransistors. Being more specific, suitable photovoltaic means might comprise a conventional silicon photocell the output of which is a voltage proportional to the amount of light striking same. Suitable photoresistive means might comprise a conventional cadmium sulfide or cadmium selenide cell the resistance of which usually varies inversely with the amount of light striking same. A suitable phototransistor might comprise a conventional bipolar or field-effect device that is responsive to radiant energy.

In the embodiment shown, electrical leads 28 couple the analog or proportional output of target transducer 26 to a conventional electronic processing means or digital voltmeter 30. The electronic subsystems comprising processing means 30 operate to convert the proportional output from transducer 26 to a numerical readout, and, as such, electronic means 30 is well known in the art. For example, electronic processing means 30 might comprise a high-gain voltage amplifier 30a to boost the signal output of transducer 26. The output of amplifier 30a is then coupled to a conventional analog-to-digital converter 30b, that, as the name implies, converts the proportional signal from aplifier 30a to a digital format or digital representation. This digital format is then coupled to a decoder-driver 30c the function of which is to decode the digital signal into a reformed digital signal capable of driving a numerical display 30d. Readout 30d displays angular displacement of shaft 10 during operation of the invention as will be described now.

In operation, the tightly defined line-pattern of laser light 24 impinges broadside on rim-band 14 and aperture 18. Initially, and during calibration, the aforementioned discontinuity of cross-section on band 14 is aligned or brought into registration with line-pattern 24. This is seen as position 24a in FIG. 2. At this position, track aperture 18 interacts with line-pattern 24 in a way that causes no light or a minimum amount of light to reach or strike transducer 26 and so a relative 0° position is defined. Conversely, when disc 12 and hence shaft 10 is rotated minutely in the direction of arrow A in FIG. 1, base 18a is brought contiguous to line-pattern 24. This exposes the line-pattern to what is, for practical purposes, the full width of base 18a. This is seen as position 24b in FIG. 2. At this position, track aperture 18 interacts with line-pattern 24 in a way that causes a maximum amount of light to strike or reach transducer 26. The electrical output of transducer 26 at this last-mentioned position then defines full rotation or a relative 360° displacement of shaft 10. The signal output swing of transducer 26 between the aforementioned 0° and 360° positions is taken into account by analog-to-digital converter 30b to provide reference points against which measurements are made. As shaft 10 rotates in direction of arrow B in FIG. 1, triangular aperture 18 continually alters, or, in a manner of speaking, modulates the height of line-pattern 24 immediately impinging thereon and transmitted to detector means 26 as this aperture moves or stops in the sight-line (i.e., line-pattern 24) of the laser. Stated another way, optical track 16, or, more precisely and in this case, triangular aperture 18 interacts with the maintained orientation of line-pattern 24 thereby altering the height of the line-pattern that is transmitted to transducer 26. The amount of light "seen" by transducer 26 has, owing to the aforementioned interaction, a one-to-one correspondence between the amount of light passing through or transmitted by triangular means 18 and the angular displacement of band 14 relative to line-pattern 24.

For purposes of illustration, FIG. 2 shows several discrete angular displacements of shaft 10, at 90°, 180° and 270° of shaft rotation relative to the maintained position of line-pattern 24. Associated with each of these discrete angular displacements is a corresponding and unique transmitted line-height indicated respectively as 24c, 24d and 24e. Owing to simple geometric proportion, the amount or the intensity of the "modulated" radiation transmitted to detector 26 varies linearly and unambiguously. The signal is "unambiguous" because, for over the full rotational range of the optical track, the given amount of light that is transmitted to the target transducer, and that corresponds to a given relative rotation of the optical track, is unique and unduplicated. Hence, the output from detector 26 is a linearly varying signal that is proportional to the light transmitted through optical track 16. And, the light transmitted through optical track is, of course, a function of the angular displacement of same relative to line-beam 24.

With this operation in mind and by way of a numerical illustration, if the aformentioned output swing of transducer 26 in combination with amplifier 30a were to range from 0 volts to 3.6 volts, there would be a 0.01 volt change for each degree of revolution of aperture 18 relative to line-beam 24. Using this 3.6 volt swing as a reference and applying the output of the transducer and amplifier to a conventional digital voltmeter, the displayed voltage would correspond to the relative angular displacement directly. For example, a 2.73 volt reading on the digital voltmeter would mean a 273° rotation of aperture 18 and thus shaft 10 relative to line-beam 24.

It will be readily apparent to those skilled in the art that even minute displacements of track 16 and thus shaft 10 can be readily detected by conventional methods. For example, one or several high-gain differential amplifiers singularly or in cascade-connection can amplify milli or microvolt changes from detector 26 to high outputs. Thus, by the use of appropriate scaling factors, expanded scale measurement is possible thereby providing extremly fine or hyperfine resolution of angular displacement.

Turning now to FIGS. 3 and 4, there is shown another embodiment of the present invention used to indicate angular displacement of a shaft 310. An optical track generally indicated by reference numeral 316 is attached to, or formed on, the external periphery of shaft 310 as shown. Optical track means 316 is configured somewhat similar to optical track 16 as described with reference to FIGS. 1 and 2. However, in the embodiment under discussion, optical track 316 comprises a right-triangle 318 one flat side of which is mirror polished. Triangle 318 is placed or formed on shaft 310 with the polished side facing outwards. The longer leg of triangle 318, leg 318a, is dimensioned so as to wrap ring-like around shaft 310 to meet the vertex point of the right-angle included within right-triangle 318, as shown. The shorter leg of triangle 318, leg 318b, is oriented parallel to the longitudinal axis of shaft 310.

A stationary souce of radiation 320, preferably laser, has its output directed towards the shaft and mirrored track 318 thereby impinging broadside on track 318. Laser source 320 is in all respects similar to laser 20 discussed in the embodiment of FIGS. 1 and 2. Thus, the output of laser 320 is formed into a narrow beam or tightly defined line-beam 324 by means of a slit 322. The broad width of line-beam 324 is dimensioned to be at least as long as triangular side 318b. It will be observed that slit 322 is fixedly oriented parallel to the longitudinal axis of shaft 310. Hence line-beam 324 illuminating triangular mirror 318 is likewise fixedly oriented parallel to the longitudinal axis of this shaft. Thus, as shaft 310 and triangular mirror 318 revolve relative to a stationary line-beam 324, the line-beam remains orthogonal to side 318a.

A stationary target transducer or detector 326, generally similar to detector 26 described earlier, is aligned relative to source 320 and triangular mirror 318 so as to intercept line-beam 324a reflecting from triangular mirror 318. Electrical leads 28 couple the output of target transducer 326 to electronic processing means 30, described earlier. Electronic means 30 converts the output of transducer 326 to a numerical readout of relative angular displacement during operation of this embodiment as will be described now.

In operation of the embodiment of FIGS. 3 and 4, line-beam 324 illuminates a tightly defined line-pattern on triangular mirror 318 as the shaft and mirror revolve or stop in the sight-line laser 320. As triangular mirror 318 moves relative to a stationary line-pattern 324, the hypotenuse of triangular mirror 318 "cuts across" or interacts with this line-pattern thereby causing the amount of light reflected towards detector 326 to vary. Owing to a simple geometric proportion, the light thus reflected varies linearly and unambiguously. Stated another way, as triangular mirror 318 moves or stops in the sight-line of the laser, the mirror interacts with the maintained orientation of line-pattern 324 thereby altering, or, in a manner of speaking, modulating the height of reflected line-beam 324a in a way that has a one-to-one correspondence between the amount (intensity) of light reflected and the rotation of shaft 310. Because detector 326 continuously monitors or receives this reflected radiation, the output from detector 326 is a signal proportional to the amount of radiation incident on the detector. This proportional signal is then applied to electronic means 30 for digital display of the angular displacement of shaft 310 relative to line-pattern 324.

Turning now to FIG. 5, there is shown one more embodiment of the present invention used to indicate the angular displacement of shaft 510. As will be explained shortly, and in this embodiment, a line-pattern or line-beam of radiation moves relative to a stationary optical track and a stationary target detector. On the external periphery of shaft 510 there is placed a source of radiation 520, preferably laser. Laser source 520 might comprises a broadside array of laser diodes, the electrical energy to which is supplied through annular coupling rings 32 and 34. Or, laser source 520 might comprise the output of a light-pipe with the laser energy being pumped into shaft 510 from a remote laser source, the remote source not shown. The output from laser 520 is confined into a tightly defined line-pattern 524 aligned parallel to the longitudinal axis of shaft 510. A stationary annular band 514 is spaced from circumferential periphery of shaft 510 to be collar-like thereabout. Band 514 has a width coextensive to the broad length of laser source 520. An optical track 516 is disposed on band 514. In the embodiment shown, optical track means 516 is in the form of a triangular aperture 518 that is in all respects similar to triangular aperture 18 of FIGS. 1 and 2. Hence, triangular aperture 518 is in the form of an isosceles triangle having a base 518a and a vertex 518b. The height or altitude of triangle 518 drawn from base 518a is equal to the circumference of band 514 thereby causing triangular aperture 518 to subtend or cover the last-mentioned circumference. Base 518a is aligned parallel to the longitudinal axis of shaft 510 and is thus parallel to the aforementioned orientation of line-beam 324. With this construction and as with the embodiment of FIGS. 1 and 2, vertex 518a meets base 518b at a point thereby defining an abrupt discontinuity of cross-section on band 514. It will be apparent when viewing FIG. 5 that track band 514 occludes or subtends the broadside path generated by line-pattern 524 as shaft 510 revolves.

A stationary target transducer or detector 526 is in the form of a cylindrical band. Transducer band 526 is spaced from and surrounds the external periphery of track band 514 as shown. Hence, target band 526 is disposed collar-like about track band 514 with the inside cylindrical surface of target band 526 in confronting registration with the outside cylindrical surface of track band 514.

Electrical leads 28 apply or couple the output of target transducer 526 to electronic package 30. In conventional manner, electronic means 30 processes the electrical information it receives to a digital display of the angular displacement of shaft 510 relative to optical track 516 and detector 526, during operation of this embodiment as will be described now.

In operation of the embodiment of FIG. 5, line-beam 524 emminating from source 520 is intercepted by, and thus impinges broadside on a narrow line-region across the width of track band 514. Because shaft 510 revolves about a given longitudinal axis, the line-beam illuminating triangular track 518 and moving angularly relative thereto is maintained at an orientation that is parallel to base 518a. Triangular aperture 518 interacts with the aforesaid maintained parallel orientation of line-beam 524 in a way that causes an altered line-width or line height 524a to be sent to detector band 526. It will be apparent that that portion of band 514 and hence track 516 that, at a given instant, is illuminated by line-beam 524, alters or "modulates" the beam of light impinging on this track and sent to transducer band 526. Put another way, the amount of light transmitted to target transducer 526 has, owing to the unique configuration of track means 516 and the maintained aforesaid parallel orientation of line-beam 524, a one-to-one correspondence between the amount of light transmitted to transducer 526 and the angular displacement of shaft 510. The signal produced by transducer 526 is proportional to the amount of light striking same. Leads 28 couple this analog signal to electronic means 30 for processing and digital display as noted above.

In all of the foregoing embodiments, it will be apparent that once the apparatus is calibrated and zeroed correctly the apparatus will provide accurate readings irrespective of the direction of shaft rotation. And it will be apparent, too, that, ultimately, resolution of relative angular displacement by means of the present invention is, in large part, dependent on the "sharpness" or "narrowness" of the line-pattern that is directed to impinge on the optical track, and the smoothness of the edges defining this track. Attention to these factors will tend to minimize unwanted optical effects.

It was noted before that the triangular pattern disclosed for the optical track means, and its manner of orientation relative to the broadside line of laser radiation impinging thereon, provides for a linearly varying light signal being sent to the target transducer. However, the present invention is not to be limited to linear optical tracks or laser outputs configured solely in form of line-beams. It is conceivable that laser outputs in forms other than line-beams could combine or interact with a non-linear optical track and thereby result in an unambiguous signal being sent to the target transducer. And, while laser light is disclosed as one form of radiation, the present invention is not to be limited to lasers. Other sources of radiation can be used and these might include ordinary white light, microwave radiation, X-ray radiation, atomic radiation or, indeed, sonic or ultrasonic radiation.

Moreover, using the principles of the present invention other constructions readily suggest themselves. For example, if the optical track were to comprise one "plate" of a capacitor, and if the detector were to comprise the outer "plate" of the capacitor, it would be possible to monitor the change in capacity that exists therebetween as the one "plate" moved angularly with respect to the other. According to this construction, one "plate" would be in the form of a metallic triangular pattern which would be similar to track 318 of FIG. 3 and thus attached to the relatively rotating member. The other "plate" would be, in effect, a capacitive pick-up in the form of a knife-edge that would be contiguous to but spaced from the metallic track. As the track moved angularly relative to the knife-edge, the capacity therebetween would change unambiguously. This analog change in capacity is easily monitored (for example, by making the capacitor part of the frequency determining element of a free-running oscillator) and easily converted to a digital display of relative angular displacement.

In certain constructions it might be advantageous to employ a means to direct or focus the modulated or altered radiation as it traverses from the optical track to the target transducer. Thus, if the target transducer is a phototransistor, these devices usually have a relatively small window or capture area. With this in mind, it might be desirable to use some form of light-pipe array or lens to direct all of the transmitted light into the relatively small window area of the transistor.

The present invention will find utility in a variety of systems and applications. Some of these systems might include magnetic compasses, gyrocompasses, rotational indicators, and, azimuth and direction control on appropriate hardware. Then too, not all applications require a readout for over a full 360° range because some shafts rotate or step for a limited rotational range that is less than 360°. In those applications where the angular range of interest is less than 360°, the optical track will be, of course, a likewise amount less than 360°

While only a few embodiments of the present invention have been shown and described, it is to be understood that many changes and modifications can be made hereto without departing from the spirit and scope hereof.

What is claimed is:

1. Apparatus for determining angular displacement including an optical track in the form of a single triangle disposed in continuous manner along the region of angular interest, means for producing a source of radiation, the angular displacement to be measured being determined by relative angular movement between said optical track and said radiation source means, said radiation source means having an output in the form of a vanishingly thin line-beam of constant intensity which is directed to impinge broadside on said optical track and thereby illuminate a vanishingly thin line-pattern thereon, and transducer means spaced from and aligned relative to said optical track so as to intercept said line-pattern after same impinges on said optical track and produce an output porportional thereto, said optical track interacting with and altering said line-pattern in a continuous and uninterrupted manner whereby the altered line-pattern received by said transducer means exhibits one-to-one correspondence with, and is a linear analog of, said relative angular movement.

2. The apparatus of claim 1, said transducer means being stationary relative to said radiation source means.

3. The apparatus of claim 1, said transducer means being stationary relative to said optical track means.

4. The apparatus of claim 1, the output of said radiation source means being in the form of light.

5. The apparatus of claim 4, said radiation source means; comprising a laser.

6. Apparatus for detecting and displaying angular displacement comprising an optical track in the form of a single triangle disposed in continuous manner along the region of angular interest, means for producing a source of radiation, the last-mentioned means having an output in the form of a vanishingly thin beam of constant intensity that is directed to impinge broadside on said optical track and thereby illuminate a vanishingly thin line-pattern thereon, the angular displacement to be measured being defined by relative rotation between said optical track and said line-pattern, said optical track interacting with and unambiguously modulating said line-pattern in a continuous and uninterrupted manner, transducer means spaced from and aligned relative to said optical track to intercept the modulated line-pattern and produce an electrical output proportional thereto, and electronic processing means coupled to said transducer means to receive the proportional output thereof for digital display of said relative rotation.

7. Apparatus for determining angular rotating including an optical track in the form of a continuous single geometric figure disposed along the region of angular interest, means for producing a source of radiation, the last-mentioned means having an output in the form of a narrow beam of constant intensity which is aimed so as to impinge broadside on said optical track and thereby illuminate a tightly defined line-pattern thereon, the angular displacement which is measured being defined by angular displacement of said optical track relative to said line-pattern, said optical track being configured such that when same interacts with said line-pattern impinging thereon, said optical track alters said line-pattern in a continuous and uninterrupted manner whereby the altered line-pattern analogically defines said angular displacement in an unambiguous manner, and detector means spaced from and positioned relative to said optical track so as to intercept the altered line-pattern and including a signal receiving aperture or window of a size sufficient to capture the broadside height of altered line-pattern and produce a signal proportion thereto.

8. An angle-position sensor comprising an optical track in the form of a continuous single geometric figure which is coextensive with the region of angular interest, a source of radiation having an output in the form of a thin beam of constant intensity that impinges broadside on said optical track, said beam being configured so as to illuminate a thin tightly defined line-pattern on said optical track, the angular position which is measured being determined by the angular displacemnt of said optical track relative to said line-pattern, and a detector responsive to the energy of said line-pattern, said detector being spaced from and aligned relative to said optical track so as to intercept said line-pattern after same impinges on said optical track, said optical track and line-pattern interacting in a continuous and uninterrupted manner whereby the amount of said line-pattern received by said detector exhibits a one-to-one correspondence with said angular displacement.

9. The sensor of claim 8, means coupled to said detector for processing the output of said detector into a digital display of said angular displacement.

10. The sensor of claim 8, said optical track being in the form of a triangle.

11. The sensor of claim 10, said triangle being in the form of an isosceles triangle.

12. The sensor of claim 10, said triangle being in the form of a right-triangle.

13. The sensor of claim 11, said line-pattern being oriented parallel to the base of said isosceles triangle.

14. The sensor of claim 12, said line-pattern being oriented parallel to one of the two sides of said right-triangle, the hypotenuse of said right-triangle interacting with said line-pattern in such manner whereby the amount of said line-pattern transmitted to said detector exhibits said one-to-one correspondence.

15. An angle-position transducer to detect the angular displacement between a relatively stationary member and a relatively rotating member including in combination an optical track on the relatively rotating member, said optical track in the form of a continuous single geometric figure displosed along the region of angular interest, a source of radiation having an output in the form of a narrow beam of constant intensity which is directed to impinge broadside on said optical track and thereby illuminate a tightly defined line-pattern thereon, said radiation source means being attached to the relatively stationary member, said line-pattern maintaining a fixed orientation with respect to the relatively rotating member, said optical track being configured such that when said line-pattern impinges thereon, said fixed orientation of said line-pattern interacts with said optical track in a continuous and uninterrupted manner and in a way that alters said line-pattern unambiguously, and detector means spaced from and aligned relative to said optical track to intercept the altered line-pattern and produce a signal proportional thereto.

* * * * *

UNITED STATES PATENT AND TRADEMARK OFFICE
CERTIFICATE OF CORRECTION

PATENT NO. : 4,320,293
DATED : March 16, 1982
INVENTOR(S) : Harold Guretzky

It is certified that error appears in the above-identified patent and that said Letters Patent are hereby corrected as shown below:

```
Col. 1, line 4,  "943,680" should read -- 934,680 --.
Col. 1, line 12, "may" should read -- any --.
Col. 6, line 24, "comprises" should read -- comprise --.
Col. 6, line 32, after "from" insert -- the --.
Col. 6, line 47, "324" should read -- 524 --.
Col. 6, line 48, "518a" should read -- 518b --.
Col. 6, line 49, "518b" should read -- 518a --.
Col. 7, line 58, "outer" should read -- other --.
Col. 8, line 59 (Claim 5), delete ";".
Col. 9, line 11 (Claim 7), "rotating" should read
                 -- rotation --.
```

Signed and Sealed this

Fifth Day of April 1983

[SEAL]

Attest:

GERALD J. MOSSINGHOFF

Attesting Officer

Commissioner of Patents and Trademarks